United States Patent
Henry et al.

(10) Patent No.: US 7,277,725 B1
(45) Date of Patent: Oct. 2, 2007

(54) FREQUENCY AGILE-COLLOCATED MULTI-SIGNAL RF DISTRIBUTION SYSTEM

(75) Inventors: Willard Henry, San Diego, CA (US); Thinh Q. Ho, Anaheim, CA (US); Kevin Allen, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 473 days.

(21) Appl. No.: 10/999,868

(22) Filed: Nov. 30, 2004

(51) Int. Cl.
  *H04M 1/00* (2006.01)
(52) U.S. Cl. .................. 455/553.1; 455/296; 455/67.13
(58) Field of Classification Search ................ 455/561, 455/553.1, 67.13, 67.11, 296
  See application file for complete search history.

(56) References Cited

U.S. PATENT DOCUMENTS

| | | | |
|---|---|---|---|
| 4,970,519 A * | 11/1990 | Minnis et al. | 342/165 |
| 6,539,204 B1 * | 3/2003 | Marsh et al. | 455/63.1 |
| 6,745,018 B1 * | 6/2004 | Zehavi et al. | 455/296 |
| 6,915,112 B1 * | 7/2005 | Sutton et al. | 455/67.13 |
| 7,170,849 B1 * | 1/2007 | Arivoli et al. | 370/208 |
| 2004/0137947 A1 * | 7/2004 | Nimmo-Smith | 455/561 |

* cited by examiner

Primary Examiner—Sanh D. Phu
(74) Attorney, Agent, or Firm—Peter A. Lipovsky; J. Eric Anderson; Allan Y. Lee

(57) ABSTRACT

A frequency agile collocated multi-signal rf distribution system. The system includes a plurality of receivers, a plurality of transmitters, a power amplification module, an antenna module and an interference reduction module. The power amplification module is operatively coupled to the plurality of transmitters and is capable of receiving and amplifying transmission signals, reducing interference and outputting amplified transmission signals. The antenna module is operatively coupled to the power amplification module and is capable of receiving amplified transmission signals, receiving reception signals and outputting reception signals. The interference reduction module is operatively coupled to the power amplification module, the antenna module and the plurality of receivers, and is capable of receiving amplified transmission signals and reception signals, reducing co-site interference in receptions signals, and outputting reception signals having reduced co-site interference to the plurality of receivers. A method for implementing a frequency agile collocated multi-signal rf distribution system is also described.

12 Claims, 7 Drawing Sheets

FREQUENCY AGILE-COLLOCATED MULTI-SIGNAL RF DISTRIBUTION SYSTEM

BACKGROUND OF THE INVENTION

The present invention is generally in the field of communication systems.

Typical communication systems that have multiple radios require multiple antennas, which create co-site interference and hinder frequency-hopping capabilities.

A need exists for communication systems having reduced numbers of antennas, reduced co-site interference and increased frequency-hopping communication capabilities.

DETAILED DESCRIPTION OF THE INVENTION

The present invention is directed to Frequency Agile Collocated Multi-Signal RF Distribution Systems (FDS). Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention that use the principles of the present invention are not specifically described in the present application and are not specifically illustrated by the present drawings.

DEFINITIONS

The following definitions and acronyms are used herein:

Acronym(s):

FDS—Frequency Agile Collocated Multi-Signal RF Distribution System

PAM—Power Amplification Module

AM—Antenna Module

IRM—Interference Reduction Module

MUX—Multiplexer

ATT—Attenuator

DML—Directly Modulated Link

LNA—Low Noise Amplifier

AMP—Buffer Amplifier

ISO—Isolator

TBPF—Tunable Bandpass Filter

LLC—Low-Loss Combiner

ALA—Adjustable Linear Amplifier

DC—Directional Coupler

Definition(s):

Bandpass filter—device that receives input signals and outputs selected frequencies of input signals.

The FDS includes a plurality of transmitters, a plurality of receivers, a power amplification module (PAM), an antenna module (AM) and an interference reduction module (IRM). The PAM, AM and IRM operate in conjunction to enable contemporaneous or simultaneous operation of multiple transmitters and receivers (or multiple radios) using only one transmit antenna and only one receive antenna. In one embodiment, the FDS reduces co-site interference. In one embodiment, the FDS increases frequency-hopping communication capabilities.

Figure 1A:
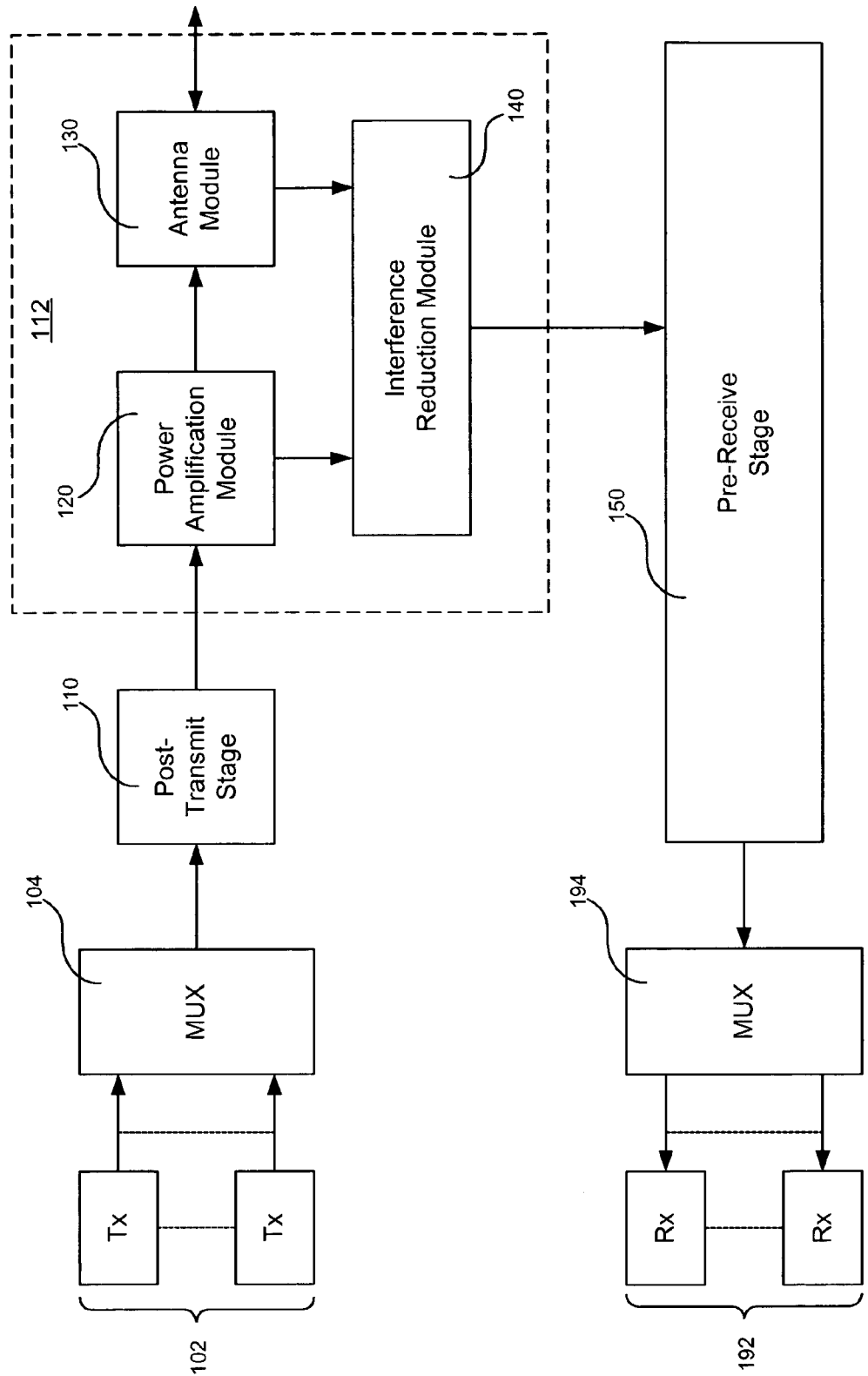
FIG. 1A is a block diagram of one embodiment of a FDS.

FIG. 1A is a block diagram of one embodiment of a FDS. As shown in FIG. 1A, FDS 112 includes PAM 120, AM 130 and IRM 140. PAM 120 of FDS 112 receives transmission signals from plurality of transmitters 102 via multiplexer (MUX) 104 and post-transmit stage 110. Post-transmit stage 110 is capable of processing transmission signals. PAM 120 amplifies transmission signals and outputs amplified transmission signals to AM 130 and IRM 140. PAM 120 is described in detail below with reference to FIGS. 1C-1D. AM 130 of FDS 112 receives transmission signals from PAM 120 and outputs transmission signals. AM 130 receives reception signals and outputs reception signals to IRM 140. AM 130 is described in detail below with reference to FIGS. 1E-1F. IRM 140 of FDS 112 receives transmission signals from PAM 120 and reception signals from AM 130. IRM 140 uses sampled transmission signals to help reduce co-site interference in reception signals. IRM 140 outputs reception signals having reduced co-site interference to a plurality of radios 192 via pre-receive stage 150 and MUX 194. Pre-receive stage 150 is capable of processing reception signals. IRM 140 is described in detail below with reference to FIG. 1G.

Figure 1B:
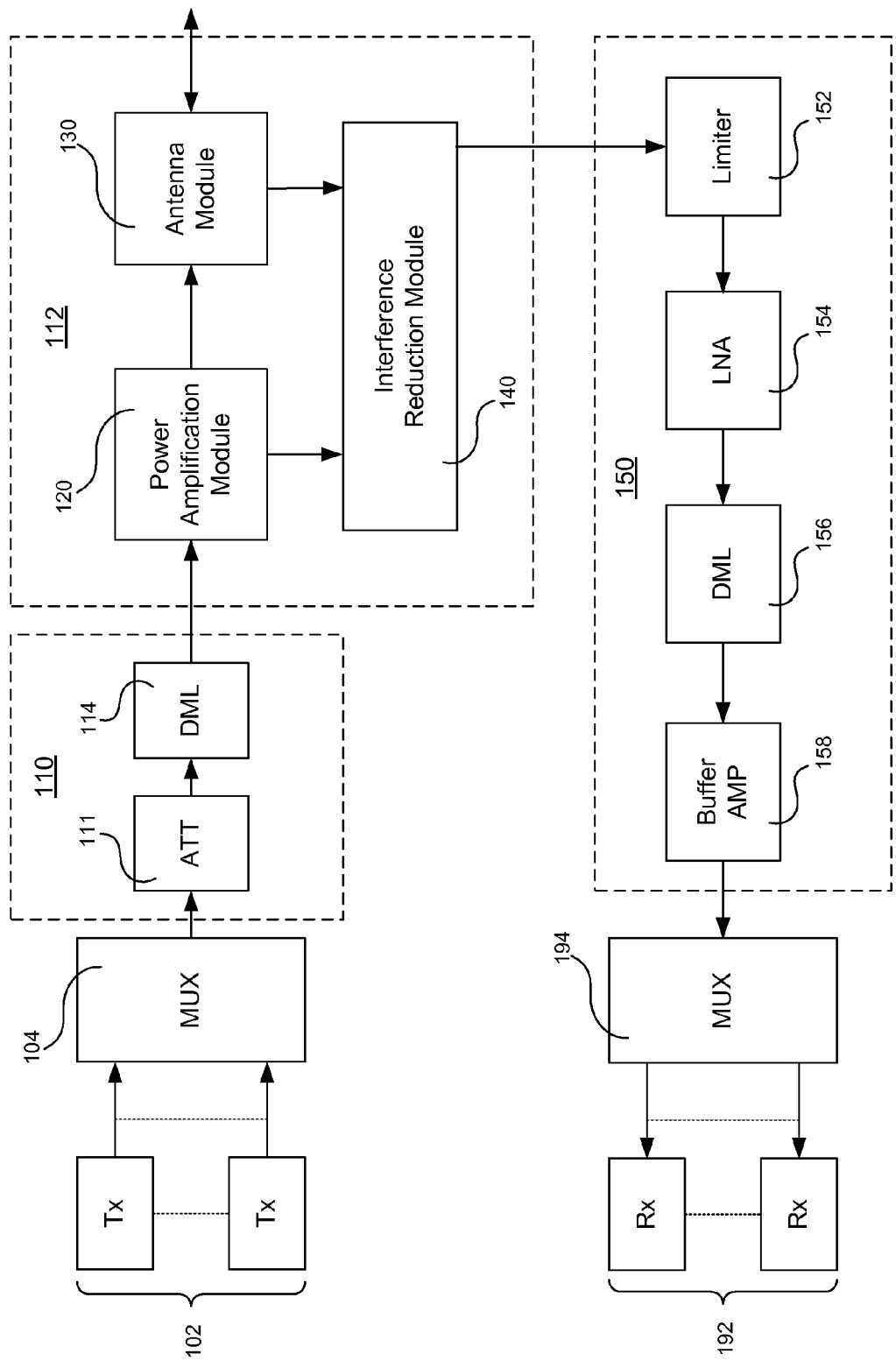
FIG. 1B is a block diagram of one embodiment of a FDS.

FIG. 1B is a block diagram of one embodiment of a FDS. The embodiment of FIG. 1B is substantially similar to the embodiment of FIG. 1A, and thus, similar components are not described in detail below. As shown in FIG. 1B, post-transmit stage 110 includes attenuator (ATT) 111 and directly modulated link (DML) 114. ATT 111 reduces the power of transmission signals. DML 114 receives transmission signals and outputs receptions signals to PAM 120. DML 114 electromagnetically isolates plurality of transmitters 102 from PAM 120. In one embodiment, DML 114 comprises a fiber optic link. In one embodiment, post-transmit stage 110 comprises DML 114. As shown in FIG. 1B, pre-receive stage 150 includes limiter 152, low noise amplifier (LNA) 154, DML 156 and buffer amplifier (AMP) 158.

Figure 1C:
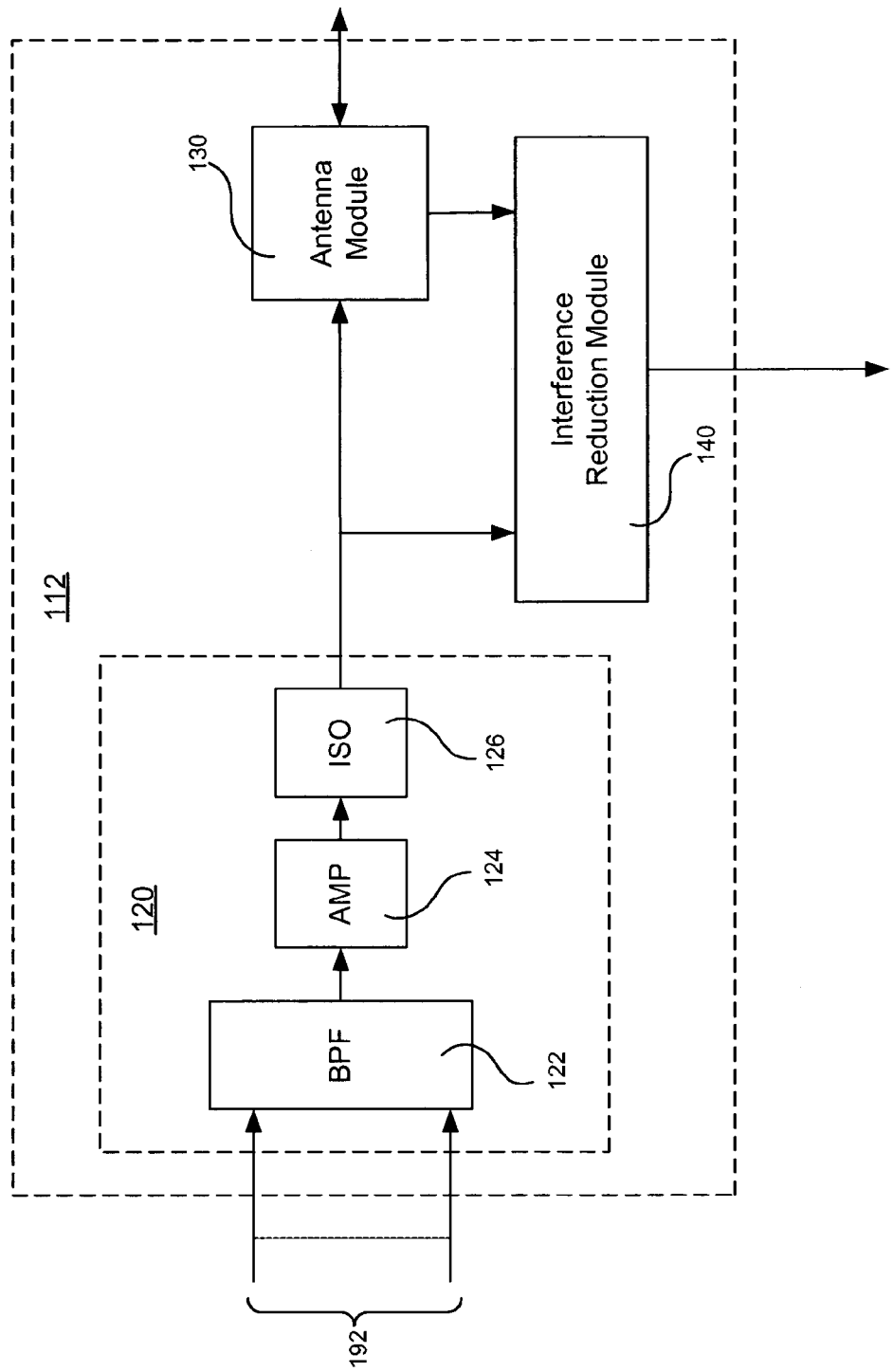
FIG. 1C is block diagram of one embodiment of a FDS.

FIG. 1C is a block diagram of one embodiment of a FDS. As shown in FIG. 1C, FDS 112 includes PAM 120, AM 130 and IRM 140. PAM 120 amplifies multiple transmit signals to a sufficient level for transmission by AM 130. PAM 120 includes bandpass filter (BPS) 122, amplifier (AMP) 124 and isolator (ISO) 126. BPS 122 receives single or multiple transmission signals 192. BPS 122 outputs only selected frequencies of transmission signals 192. AMP 124 amplifies transmission signals. In one embodiment, AMP 124 comprises a high-powered amplifier using feed forward techniques. In one embodiment, AMP 124 amplifies multiple wideband transmission signals. AMP 124 outputs amplified transmission signals. ISO 126 receives amplified transmission signals and isolates AMP 124 from forward components (e.g., AM 130 and IRM 140). ISO 126 outputs amplified transmission signals to AM 130 and IRM 140.

Figure 1D:
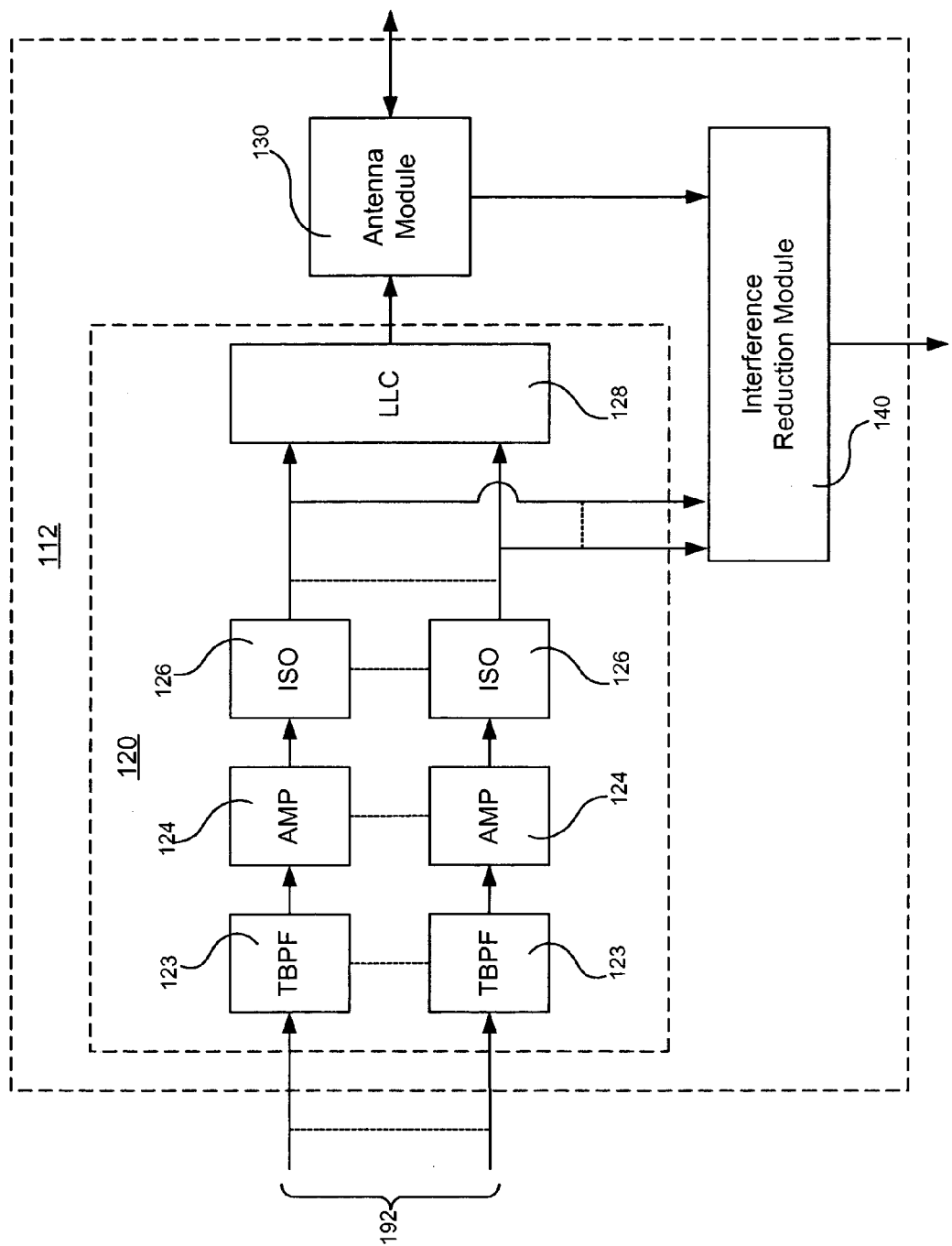
FIG. 1D is block diagram of one embodiment of a FDS.

FIG. 1D is a block diagram of one embodiment of a FDS. As shown in FIG. 1D, FDS 112 includes PAM 120, AM 130 and IRM 140. PAM 120 amplifies multiple transmit signals to a sufficient level for transmission by AM 130. PAM 120 includes tunable bandpass filters (TBPF) 123, AMP 124, ISO 126 and low-loss combiner (LLC) 128. TBPF 123, AMP 124 and ISO 126 are configured in a multiple pathway configuration, wherein each pathway includes one of each of the following: TBPF 123, AMP 124 and ISO 126. Each pathway receives transmission signals 192 at TBPF 123 and separates wideband transmission signals into multiple narrowband transmission signals. Each TBPF 123 outputs selected frequencies of wideband transmission signals and can be configured to output different frequency bands from other TBPF 123. In one embodiment, each TBPF 123 outputs a narrow frequency band that is adjacent to an output of another TBPF 123. AMP 124 receives narrowband transmission signals from TBPF 123. AMP 124 amplifies and outputs narrowband transmission signals. ISO 126 receives narrowband transmission signals from AMP 124. ISO 126 outputs transmission signals to LLC 128 and IRM 140. In one embodiment, IRM 140 includes multiple interference reduction sub-modules, where each narrowband transmission signal is input to a separate interference reduction module. LLC 128 receives multiple narrowband transmission signals from multiple pathways. LLC 128 receives narrowband transmission signals from ISO 126. LLC 128 recombines the multiple narrowband transmission signals into a single wideband transmission signal (i.e., a recombined transmission signal). LLC 128 outputs the single wideband transmission signal to AM 130.

Figure 1F:
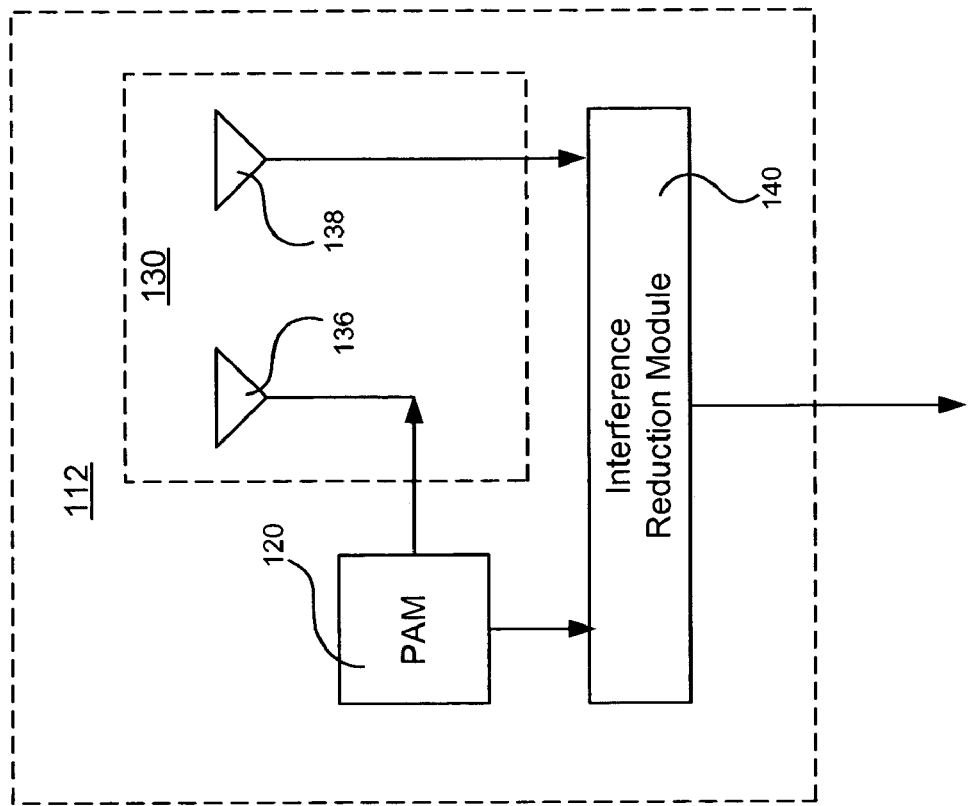
FIG. 1F is block diagram of one embodiment of a FDS.
Figure 1E:
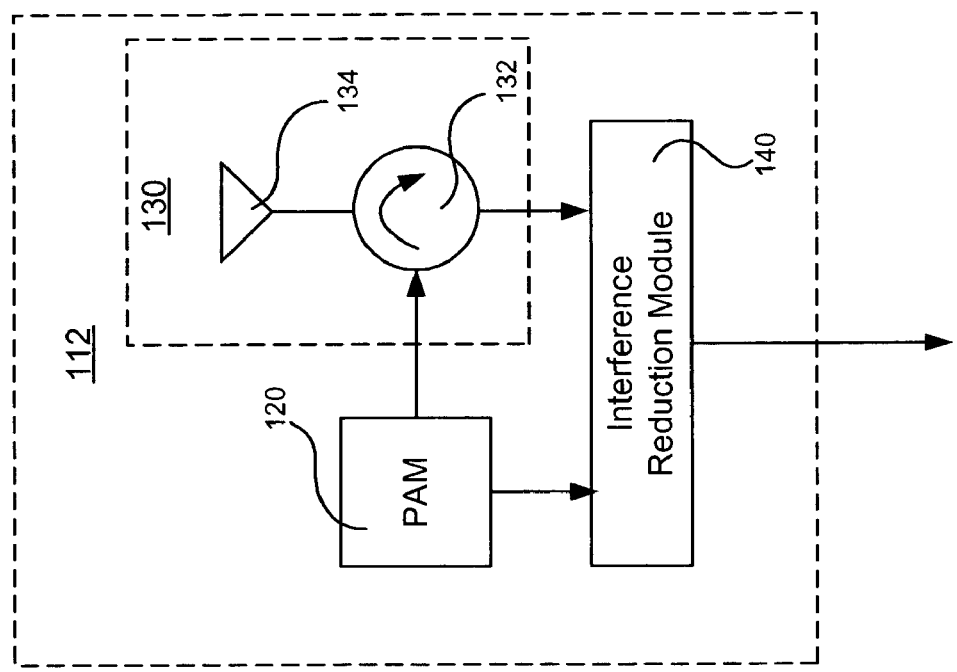
FIG. 1E is block diagram of one embodiment of a FDS.

FIG. 1E is a block diagram of one embodiment of an FDS. As shown in FIG. 1E, FDS 112 includes PAM 120, IRM 140 and AM 130. AM 130 includes circulator 132 and antenna 134. Reception and transmission pathways are isolated using circulator 132 and antenna 134. Regarding reception pathways, antenna 134 receives reception signals and inputs reception signals to circulator 132. Circulator 132 receives reception signals from antenna 134 and inputs reception signals to IRM 140. Regarding transmission pathways, circulator 132 receives transmission signals from PAM 120. Circulator 132 inputs transmission signals to antenna 134. Antenna 134 receives transmission signals from circulator 132 and outputs transmission signals.

FIG. 1F is a block diagram of one embodiment of an FDS. As shown in FIG. 1F, FDS 112 includes PAM 120, IRM 140 and AM 130. AM 130 includes transmission antenna 136 and reception antenna 138. Reception and transmission pathways are isolated using two antennas: transmission antenna 136 and reception antenna 138. Regarding reception pathways, reception antenna 138 receives reception signals and inputs reception signals to IRM 140. Regarding transmission pathways, transmission antenna 134 receives transmission signals from PAM 120 and outputs transmission signals.

Figure 1G:
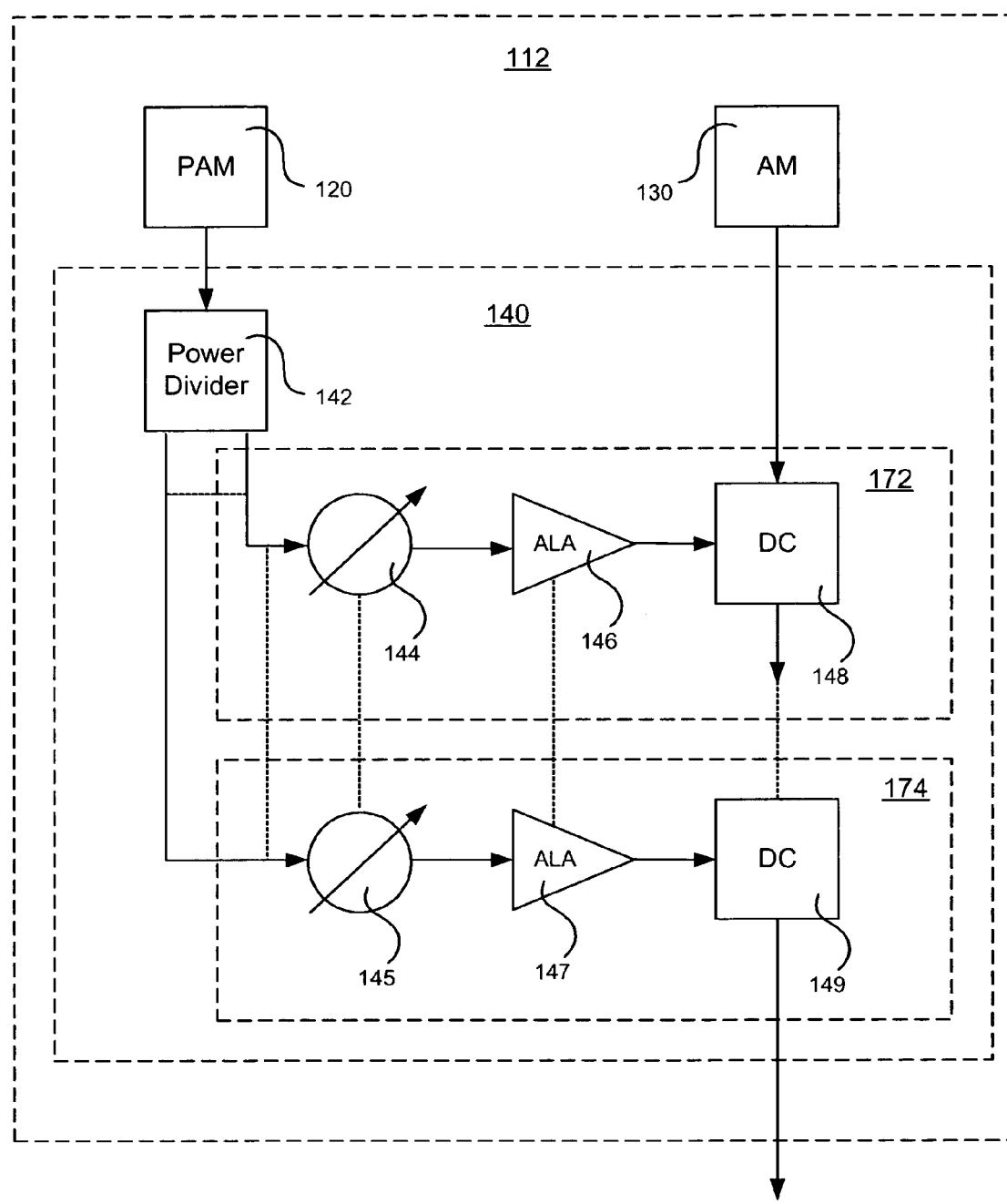
FIG. 1G is block diagram of one embodiment of a FDS.

FIG. 1G is a block diagram of one embodiment of an FDS. As shown in FIG. 1G, FDS 112 includes PAM 120, AM 130 and IRM 140. IRM 140 receives transmission signals from PAM 120 and reception signals from AM 130. IRM 140 includes coarse and fine interference reduction elements. The coarse interference reduction element provides large reductions in interference, while the fine interference reduction element provides small reductions in interference. IRM 140 includes power divider 142, coarse interference reducer 172 and fine interference reducer 174. Power divider 142 receives transmission signals from PAM 120. Power divider 142 divides transmission signals and outputs multiple transmission signals.

Coarse interference reducer 172 includes at least one pathway, wherein a pathway includes one of each of the following: phase shifter 144, adjustable linear amplifier (ALA) 146 and directional coupler (DC) 148. Phase shifter 144 receives transmission signals from PAM 120. Phase shifter 144 shifts the phase of signals to approximately equal the phase shift of a signal. Phase shifter 144 further shifts signals 180 degrees, which allows coarse interference reducer 172 to reduce undesirable interference in reception signals that is caused by transmission signals. In one embodiment, coarse interference reducer 172 comprises a single pathway comprising one of each of the following: phase shifter 144, ALA 146 and DC 148. In one embodiment, coarse interference reducer 172 comprises multiple pathways. Coarse interference reducer 172 outputs phase-shifted transmission signals. ALA 146 receives, amplifies and outputs phase-shifted transmission signals. In one embodiment, ALA 146 amplifies phase-shifted transmission signals to approximately equal the amplitude of undesirable signals. DC 148 receives reception signals from AM 130 and phase-shifted transmission signals from ALA 146. DC 148 couples reception signals and phase shifted transmission signals. DC 148 outputs coupled signals. In embodiments having multiple pathways, DC 148 outputs coupled signals to directional couplers in adjacent pathways. In the final pathway of coarse interference reducer 172, DC 148 outputs coupled signals to fine interference reducer 174.

Fine interference reducer 174 includes at least one pathway, wherein a pathway includes one of each of the following: phase shifter 145, ALA 147 and DC 149. Phase shifter 145 receives transmission signals from PAM 120. Phase shifter 145 shifts the phase of signals to approximately equal the phase shift of a signal. Phase shifter 145 further shifts signals 180 degrees, which allows fine interference reducer 174 to reduce undesirable interference in reception signals that is caused by transmission signals. In one embodiment, fine interference reducer 174 comprises a single pathway comprising one of each of the following: phase shifter 145, ALA 147, DC 149. In one embodiment, fine interference reducer 174 comprises multiple pathways. Fine interference reducer 174 outputs phase-shifted transmission signals. ALA 147 receives, amplifies and outputs phase-shifted transmission signals. In one embodiment, ALA 147 amplifies phase-shifted transmission signals to approximately equal the amplitude of undesirable signals. DC 149 receives coupled signals from DC 148 and phase-shifted transmission signals from ALA 147. DC 149 couples reception signals and phase-shifted transmission signals. DC 149 outputs coupled signals. In embodiments having multiple pathways, DC 149 outputs coupled signals to directional couplers in adjacent pathways. In the final pathway of fine interference reducer 174, DC 149 outputs coupled signals to pre-receive stage 150 (shown in FIG. 1A).

Figure 2:
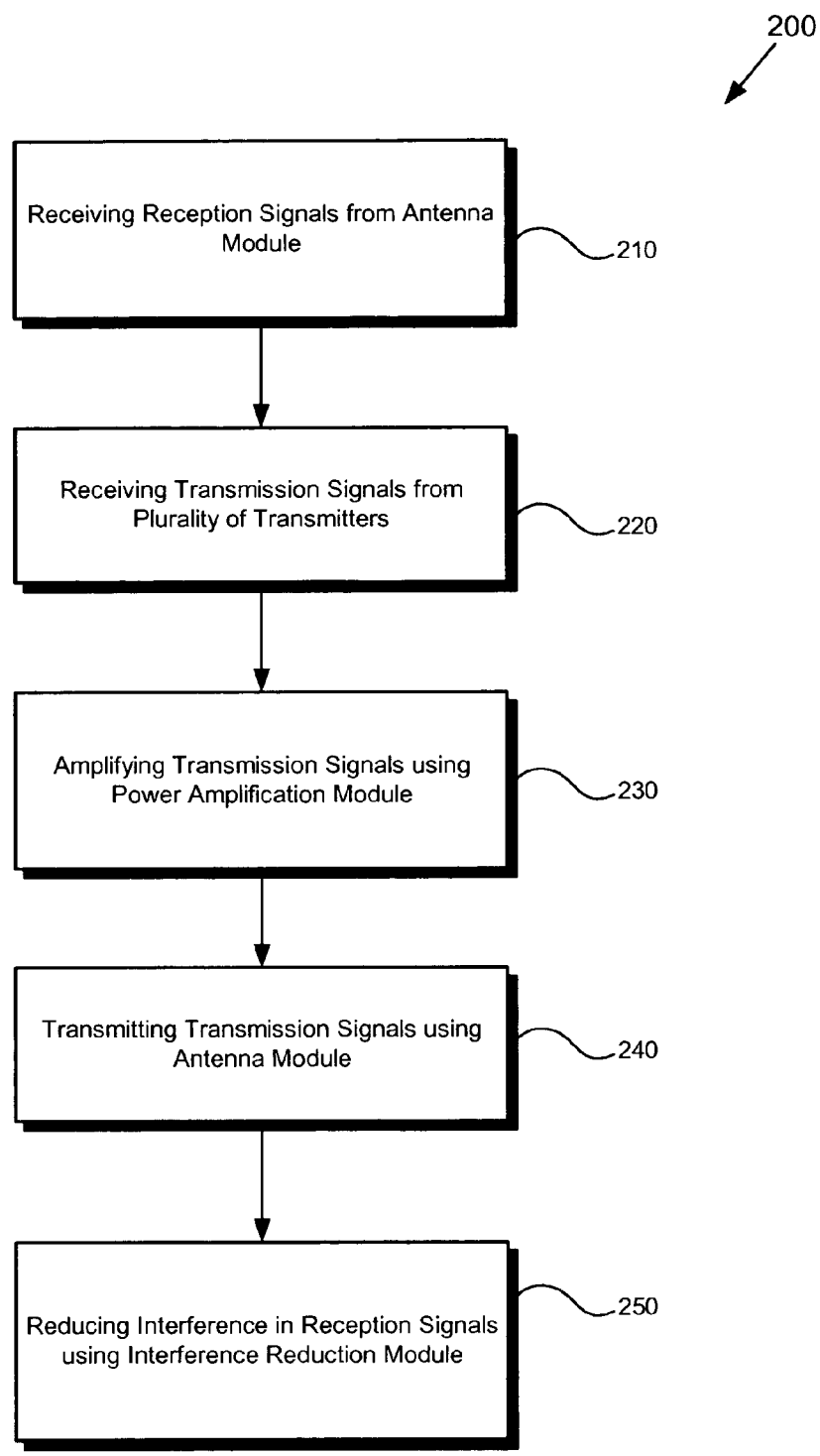
FIG. 2 is a flowchart of an exemplary method of one embodiment of a FDS.

FIG. 2 is a flowchart illustrating exemplary process steps taken to implement an exemplary FDS. Certain details and features have been left out of flowchart 200 of FIG. 2 that are apparent to a person of ordinary skill in the art. For example, a step may consist of one or more sub-steps or may involve specialized equipment or materials, as known in the art. While STEPS 210 through 250 shown in flowchart 200 are sufficient to describe one embodiment of the FDS, other embodiments of the FDS may utilize steps different from those shown in flowchart 200.

Referring to FIGS. 1A and 2, at STEP 210 in flowchart 200, the method receives reception signals from AM 130. AM 130 isolates reception and transmission pathways. After STEP 210, the method proceeds to STEP 220. At STEP 220 in flowchart 200, the method receives transmission signals from a plurality of transmitters 102. After STEP 220, the method proceeds to STEP 230. At STEP 230 in flowchart 200, the method amplifies transmission signals using PAM 120. After STEP 230, the method proceeds to STEP 240. At STEP 240 in flowchart 200, the method transmits transmission signals using AM 130. After STEP 240, the method proceeds to STEP 250. At STEP 250 in flowchart 200, the method reduces interference in reception signals using IRM 140. The method terminates at STEP 250. Those of ordinary skill in the art shall recognize that some of the STEPS of flowchart 200 can be performed in different orders without departing from the scope or spirit of the method. For example, STEP 220 can be performed prior to STEP 210.

From the above description of the invention, it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

We claim:

1. A frequency agile collocated multi-signal rf distribution system, comprising:
   a) a plurality of receivers, capable of receiving reception signals;
   b) a plurality of transmitters, capable of outputting transmission signals;
   c) a power amplification module, operatively coupled to said plurality of transmitters, capable of receiving and amplifying transmission signals, reducing interference and outputting amplified transmission signals, wherein said power amplification module comprises:
      i) a bandpass filter, operatively coupled to said plurality of transmitters, capable of receiving transmission signals and outputting selected frequencies of transmission signals;
      ii) an amplifier, operatively coupled to said bandpass filter, capable of receiving and amplifying transmission signals;
      iii) an isolator, operatively coupled to said amplifier, said antenna module and said interference reduction module, capable of receiving amplified transmission signals, and capable of isolating said amplifier from forward components, and capable of outputting transmission signals to said antenna module and said interference reduction module;
   d) an antenna module, operatively coupled to said power amplification module, capable of receiving amplified transmission signals, receiving reception signals and outputting reception signals;
   e) an interference reduction module, operatively coupled to said power amplification module, said antenna module and said plurality of receivers, capable of receiving amplified transmission signals and reception signals, and capable of reducing co-site interference in receptions signals, and capable of outputting reception signals having reduced co-site interference to said plurality of receivers.

2. The system of claim 1, further comprising:
   f) a post-transmit stage, operatively coupled to said plurality of transmitters and said power amplification module, capable of receiving, processing and outputting transmission signals;
   g) a pre-receive stage, operatively coupled to said plurality of receivers and said interference reduction module, capable of receiving, processing and outputting reception signals.

3. A frequency agile collocated multi-signal rf distribution system comprising:
   a) a plurality of receivers, capable of receiving reception signals;
   b) a plurality of transmitters, capable of outputting transmission signals;
   c) a power amplification module, operatively coupled to said plurality of transmitters, capable of receiving and amplifying transmission signals, reducing interference and outputting amplified transmission signals, wherein said power amplification module comprises:
      i) a plurality of pathways, wherein a pathway comprises:
         (1) a tunable bandpass filter, operatively coupled to said plurality of transmitters, capable of receiving wideband transmission signals and outputting selected frequencies of wideband transmission signals;
         (2) an amplifier, operatively coupled to said tunable bandpass filter, capable of receiving and amplifying narrowband transmission signals;
         (3) an isolator, operatively coupled to said amplifier and said interference reduction module, capable of receiving amplified narrowband transmission signals, and capable of isolating said amplifier from forward components, and capable of outputting narrowband transmission signals;
      ii) a low-loss combiner, operatively coupled to said plurality of pathways, capable of receiving narrowband transmission signals, and capable of recombining said narrowband transmission signals, and capable of outputting a recombined transmission signal
   d) an antenna module, operatively coupled to said power amplification module, capable of receiving amplified transmission signals receiving reception signals and outputting reception signals;
   e) an interference reduction module, operatively coupled to said power amplification module, said antenna module and said plurality of receivers, capable of receiving amplified transmission signals and reception signals, and capable of reducing co-site interference in receptions signals, and capable of outputting reception signals having reduced co-site interference to said plurality of receivers.

4. The system of claim 3, wherein each of said plurality of pathways separates wideband transmission signals into narrowband transmission signals having a different frequency band than other pathways.

5. The system of claim 4, wherein said different frequency band of said pathway is adjacent to another said different frequency band of another said pathway.

6. The system of claim 3, wherein said wherein each of said plurality of pathways separates wideband transmission signals into narrowband transmission signals having a different frequency band than other pathways.

7. The system of claim 3, wherein said interference reduction module comprises a plurality of interference reduction sub-modules, wherein each sub-module of said plurality of sub-modules is capable of receiving narrowband transmission signals.

8. The system of claim 1, wherein said antenna module comprises:
   i) a circulator, operatively coupled to said power amplification module and said interference reduction module, capable of isolating reception and transmission pathways, and capable of receiving transmission signals and outputting reception signals;
   ii) an antenna, operatively coupled to said circulator, capable of receiving reception signals and transmitting transmission signals.

9. The system of claim 1, wherein said antenna module comprises:
   i) a transmission antenna, operatively coupled to said power amplification module, capable of receiving and outputting transmission signals;
   ii) a reception antenna, operatively coupled to said interference reduction module, capable of receiving and outputting reception signals.

10. The system of claim 1, wherein said interference reduction module comprises:
    i) a power divider, operatively coupled to said power amplification module, capable of receiving and dividing transmission signals, and capable of outputting multiple transmission signals;
    ii) a coarse interference reducer, operatively coupled to said power divider and said antenna module, capable of receiving transmission signals and reception signals, and capable of providing large reductions in interference, and capable of outputting directional coupled signals;
    iii) a fine interference reducer, operatively coupled to said power divider and said coarse interference reducer, capable of receiving transmission signals, and capable of providing small reductions in interference, and capable of outputting directional coupled signals.

11. The system of claim 10, wherein said coarse interference reducer comprises at least one pathway, wherein each pathway comprises:
    (1) a phase shifter, operatively coupled to said power divider, capable of shifting a phase of transmission signals to a signal plus 180 degrees and outputting phase-shifted transmission signals;
    (2) an adjustable linear amplifier, operatively coupled to said phase shifter, capable of amplifying phase-shifted transmission signals and outputting phase-shifted transmission signals;
    (3) a directional coupler, operatively coupled to said adjustable linear amplifier and a component selected from the group consisting of said antenna module and an adjacent pathway directional coupler, capable of receiving and coupling phase-shifted transmission signals and a signal selected from the group consisting of reception signals and adjacent pathway coupled signals, and capable of outputting directional coupled signals.

12. The system of claim 10, wherein said fine interference reducer comprises at least one pathway, wherein each pathway comprises:
    (1) a phase shifter, operatively coupled to said power divider, capable of shifting a phase of transmission signals to a signal plus 180 degrees and outputting phase-shifted transmission signals;
    (2) an adjustable linear amplifier, operatively coupled to said phase shifter, capable of amplifying phase-shifted transmission signals and outputting phase-shifted transmission signals;
    (3) a directional coupler, operatively coupled to said adjustable linear amplifier and a previous pathway directional coupler, capable of receiving and coupling phase-shifted transmission signals and adjacent pathway coupled signals, and capable of outputting directional coupled signals.

* * * * *